Fig. 1.

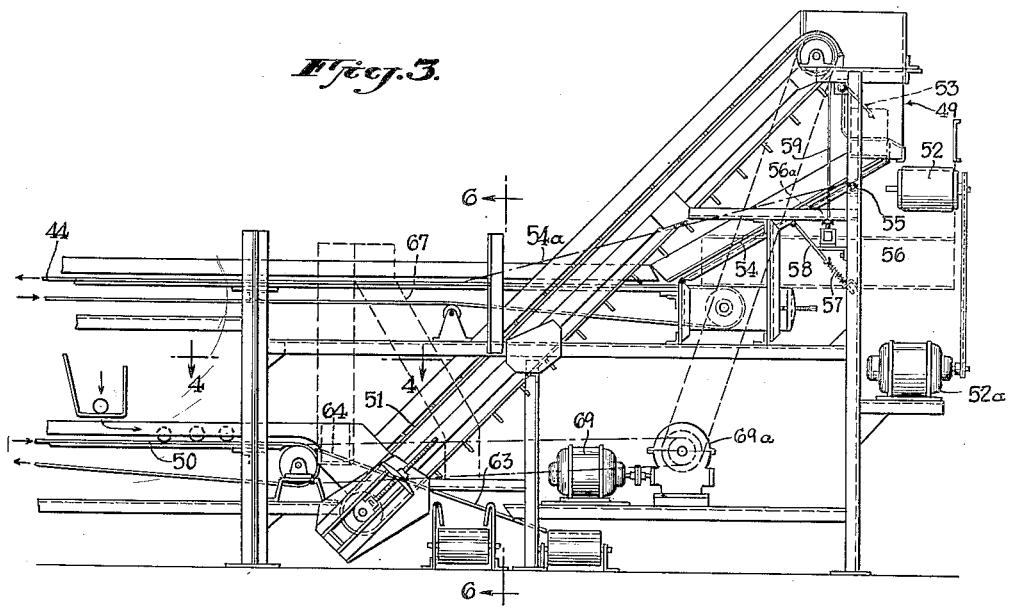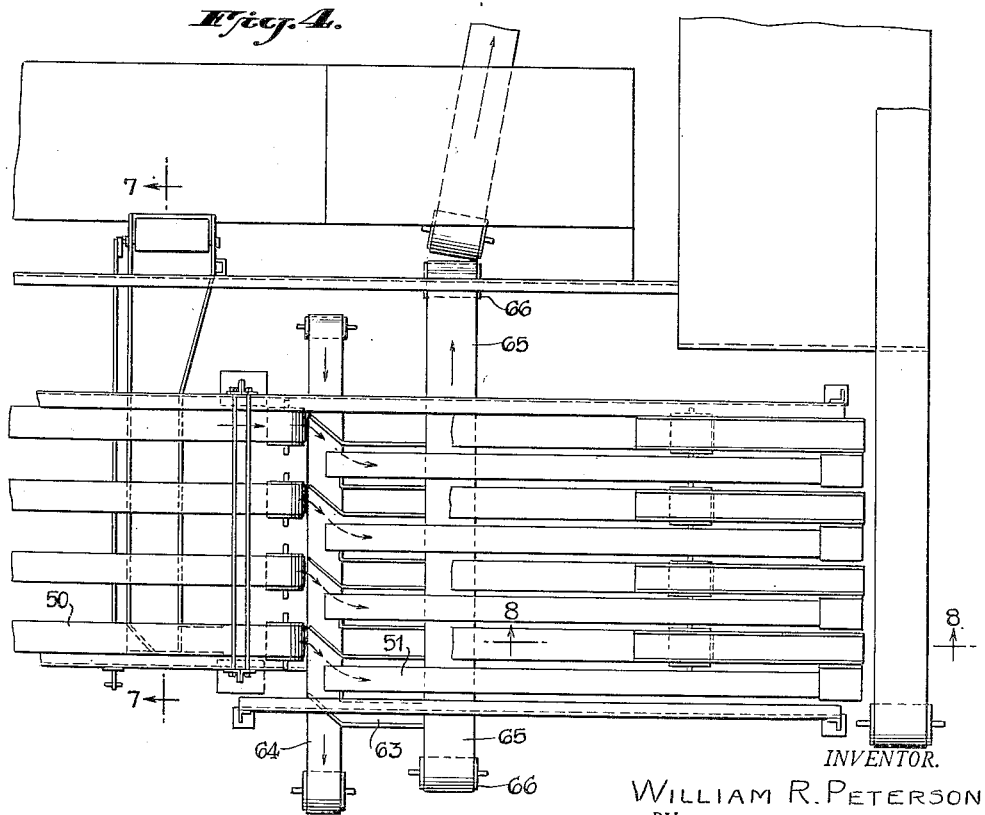

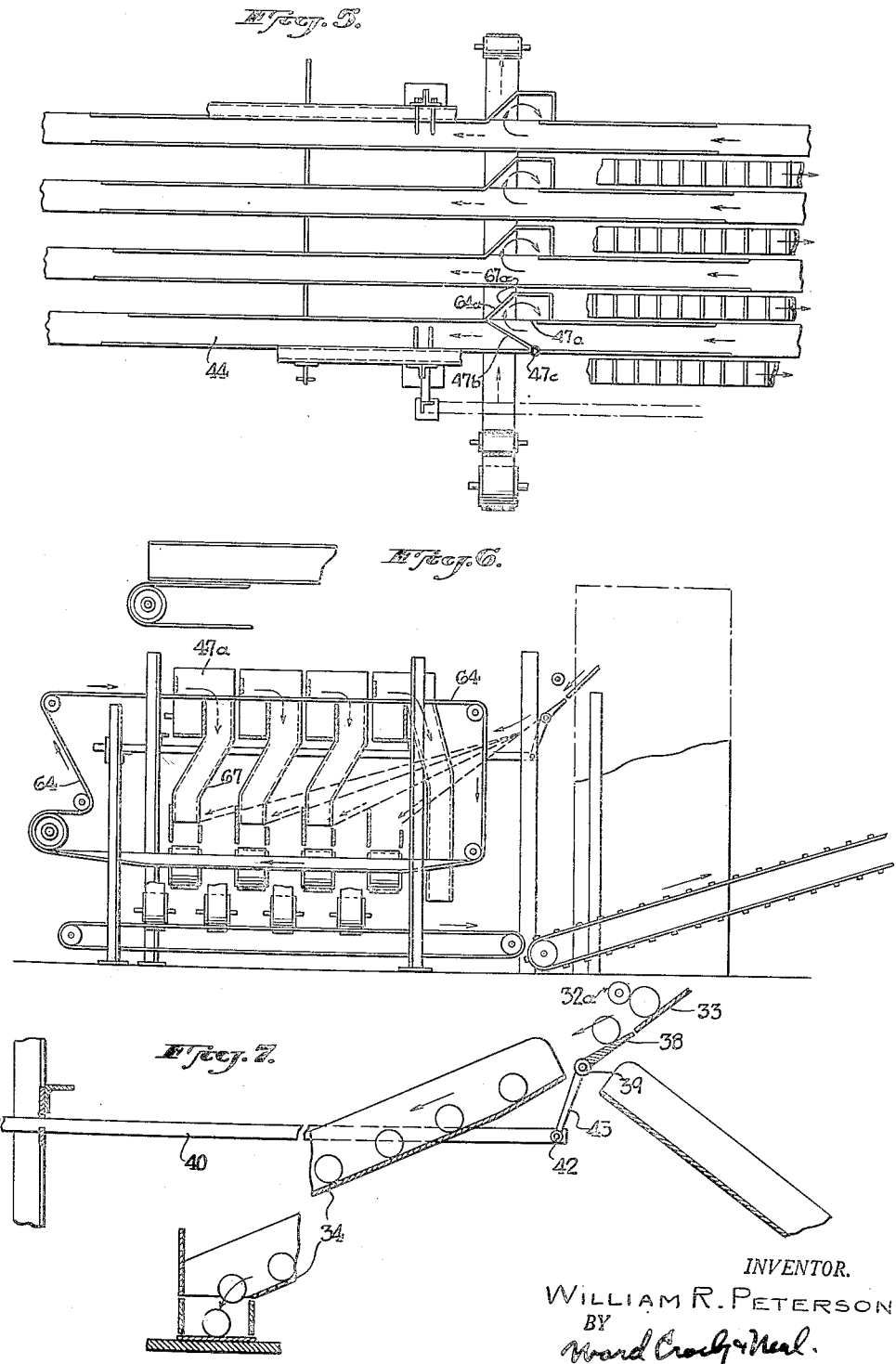

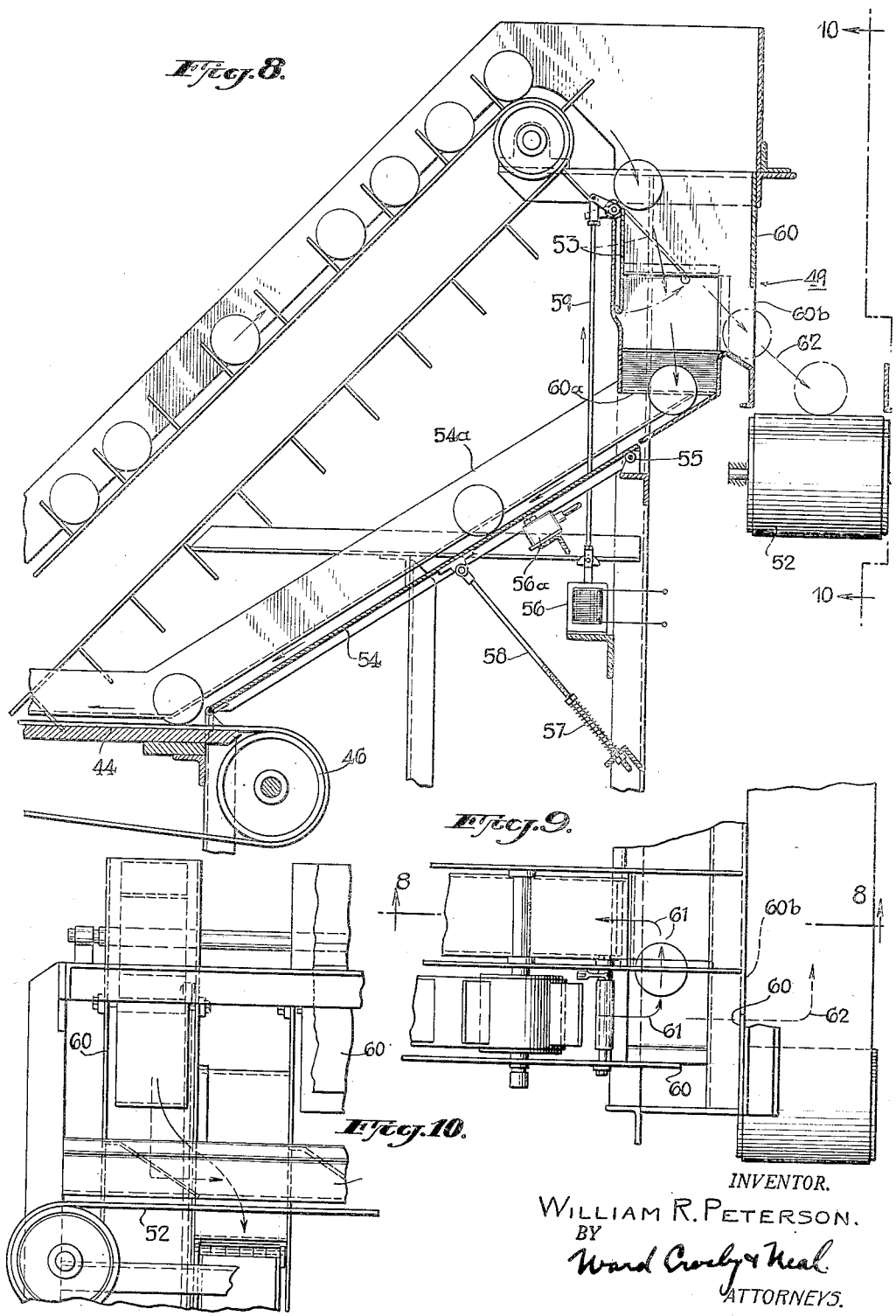

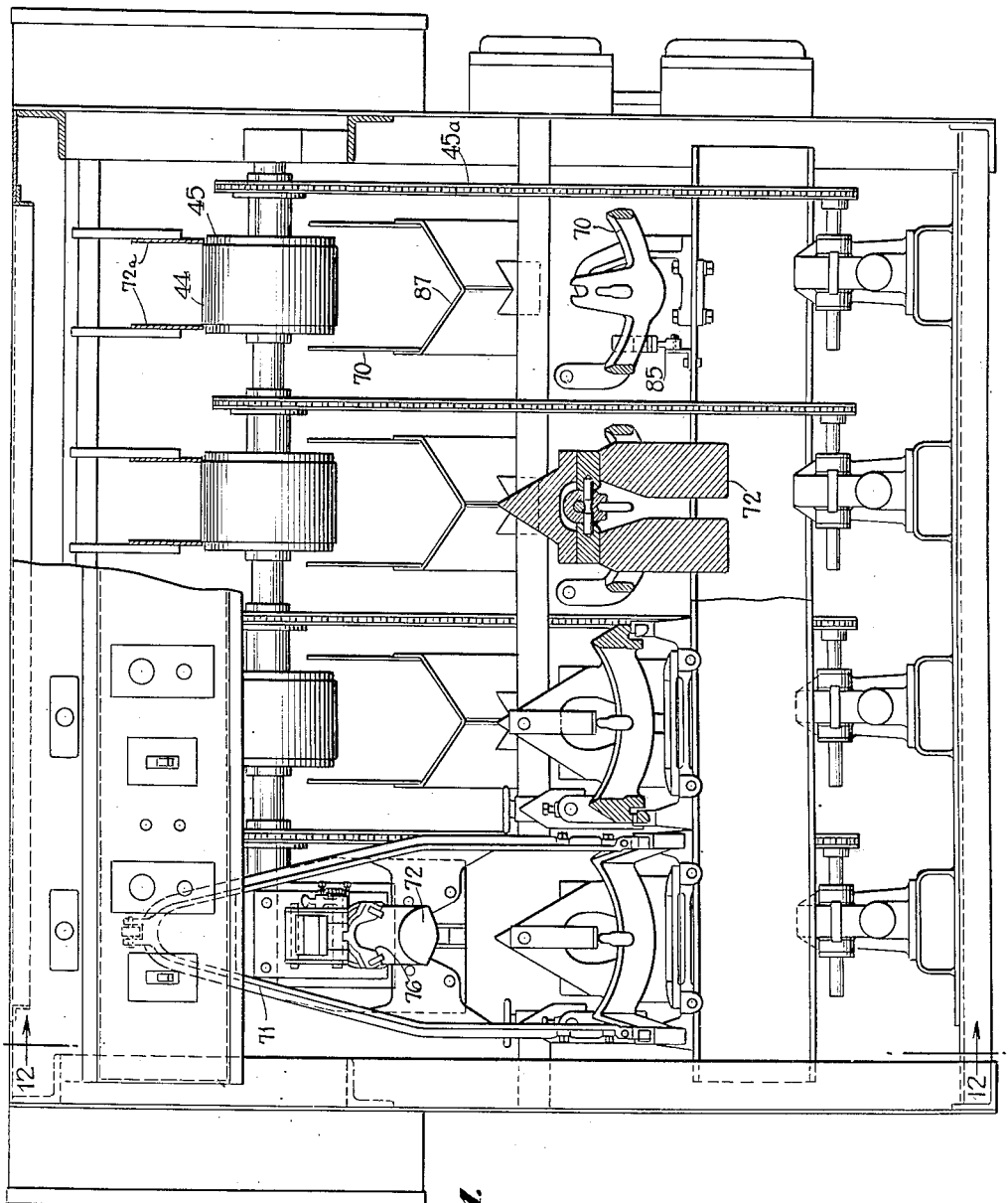

Jan. 2, 1951 — W. R. PETERSON — 2,536,516
APPARATUS FOR PACKING FRUIT AND THE LIKE
Filed Jan. 15, 1949 — 12 Sheets-Sheet 6

INVENTOR.
WILLIAM R. PETERSON.
BY Ward Crosby & Neal
ATTORNEYS.

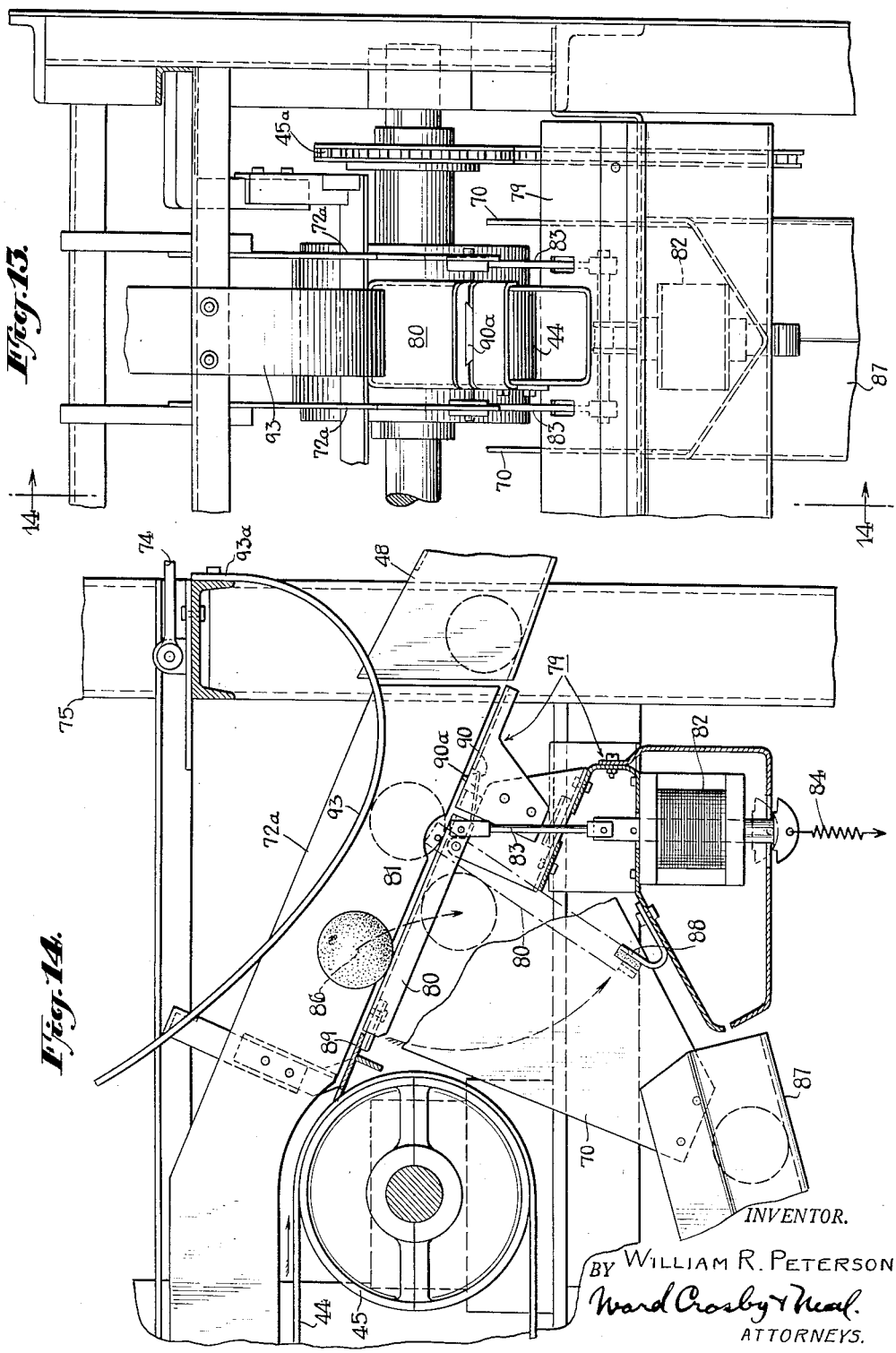

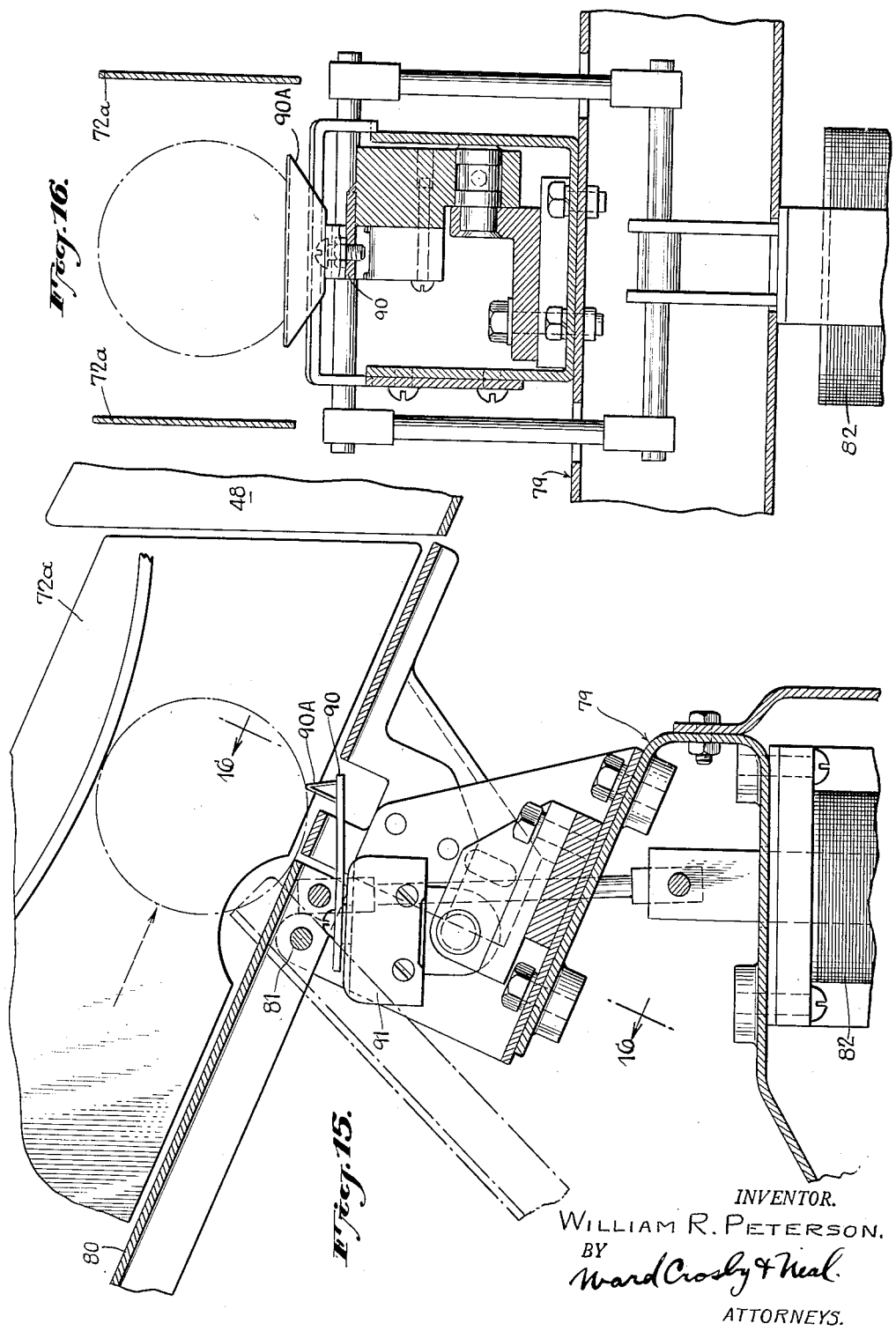

Jan. 2, 1951  W. R. PETERSON  2,536,516
APPARATUS FOR PACKING FRUIT AND THE LIKE
Filed Jan. 15, 1949  12 Sheets-Sheet 9

INVENTOR.
WILLIAM R. PETERSON.
BY
Ward Crosby & Neal.
ATTORNEYS.

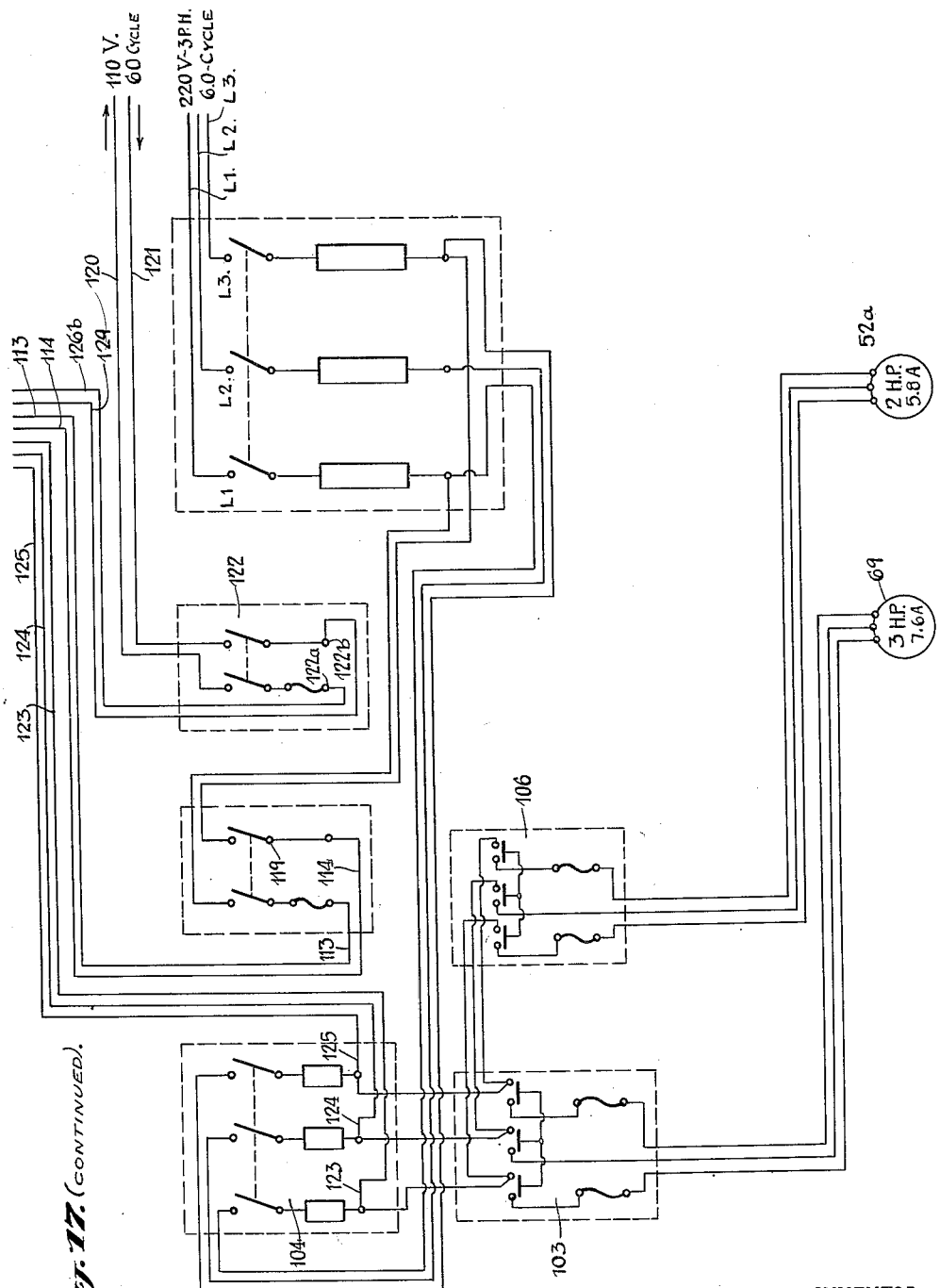

Jan. 2, 1951        W. R. PETERSON        2,536,516
APPARATUS FOR PACKING FRUIT AND THE LIKE
Filed Jan. 15, 1949        12 Sheets-Sheet 11
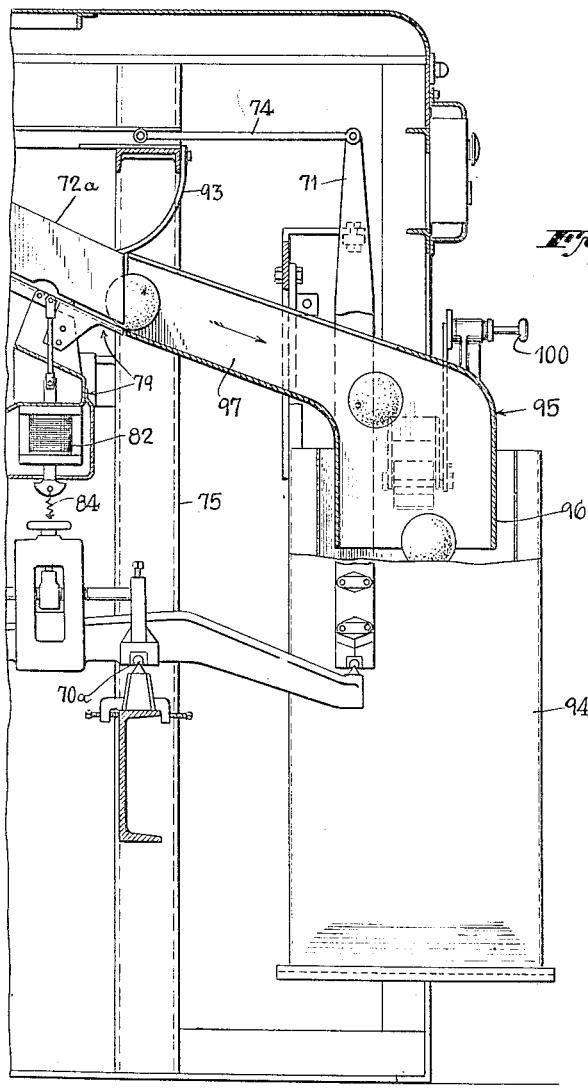
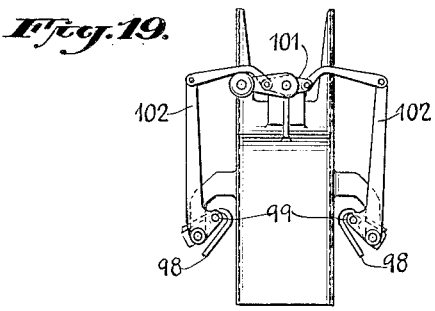
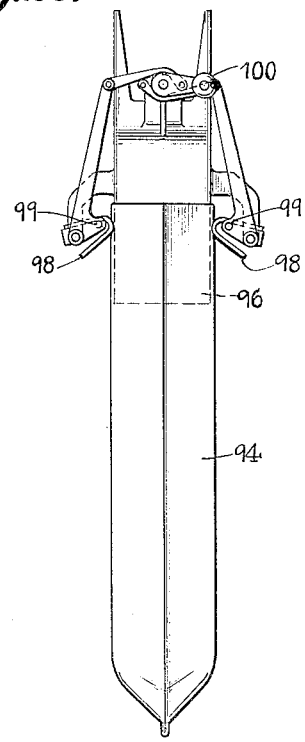
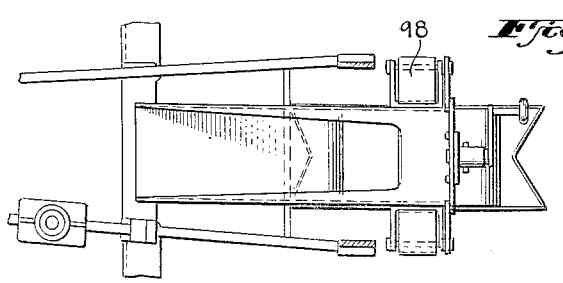
INVENTOR.
WILLIAM R. PETERSON
BY
Ward Crosby & Neal
ATTORNEYS.

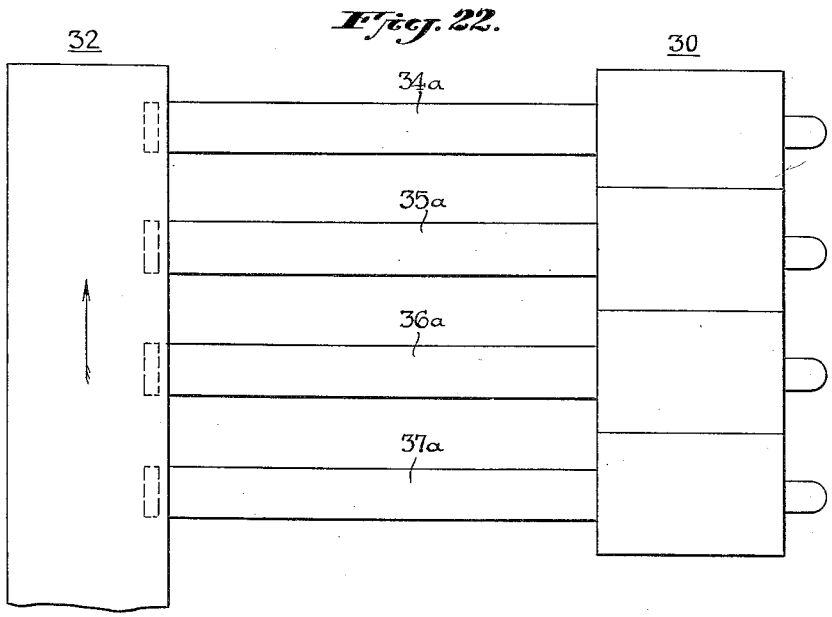
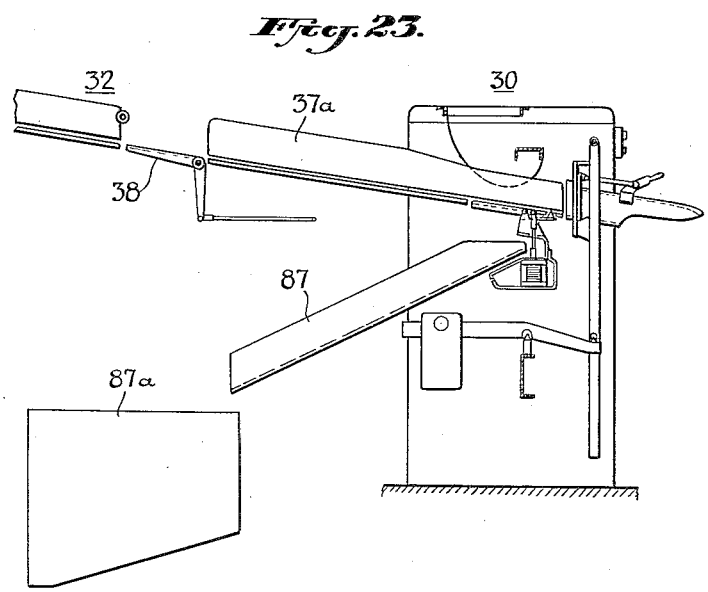

Patented Jan. 2, 1951

2,536,516

UNITED STATES PATENT OFFICE 2,536,516

APPARATUS FOR PACKING FRUIT AND THE LIKE

William R. Peterson, Oswego, N. Y., assignor to St. Regis Paper Company, New York, N. Y., a corporation of New York Application January 15, 1949, Serial No. 71,118

10 Claims. (Cl. 226—2)

This invention relates to apparatus for packing into containers objects of a substantially rounded or spherical shape, and more particularly to apparatus for filling bags with fruit, such as oranges and grapefruit.

Heretofore fruit, for example of the citrus type, has been packed by hand into containers such as wooden crates. The manual packing process has been inefficient and slow. For example, the average period for loading a normal size orange crate by hand with approximately three hundred oranges has been about five minutes. This is too high and is substantially reduced by the present invention.

Citrus fruit, such as oranges, have in the past been sorted into a plurality of preselected sizes by suitable automatic sorting devices which direct the different sizes into bins from which they are transferred manually to the crates. The orange handlers, of course, become fatigued and are reduced in speed and efficiency.

Fruit growers and shippers in the past have not had a satisfactory packing system which has enabled them to broaden their markets and to improve their competitive position by virtue of a fruit handling device which is adapted for rapidly, inexpensively and automatically transferring the fruit from a sorting apparatus into containers.

Also, there has been no satisfactory apparatus suggested in the past for rapidly and inexpensively packing containers with objects such as fruit by automatic means, largely because such apparatus have been incapable of properly controlling surges in the flow of such objects and proper means for disposing of overflow material resulting from such surges.

Moreover, apparatus of this type suggested in the past has not been able satisfactorily to prevent jamming of the objects in the system and has been incapable of high speed packing with suitable control over the flow of fruit.

One of the objects of the present invention is to overcome the above difficulties or to reduce same to insignificance.

Various, further and more specific objects, features and advantages of the invention will clearly appear from the detailed description given below taken in connection with the accompanying drawings which form a part of this specification and illustrate, by way of example, preferred arrangements of apparatus for carrying out the invention. The invention consists in such combinations and features as may be shown and described in connection with the apparatus herein disclosed.

In the drawings:

Fig. 1 is a schematic plan view of one form of the apparatus embodying the present invention;

Fig. 2 is a side view of the apparatus shown in Fig. 1;

Fig 2a is an auxiliary view taken on the line 2a—2a of Fig. 2.

Fig. 3 is an enlarged side view, partly in section and with parts broken away, of the righthand portion of the apparatus shown in Figs. 1 and 2 illustrating one form of means for governing the flow of objects in the novel packing system;

Fig. 4 is a plan view, partly in section, of the apparatus shown in Fig. 3, the section being taken substantially along line 4—4 of Fig. 3;

Fig. 5 is a plan view of parts of the apparatus shown in Fig. 3 indicating a means for carrying off an overflow or surplus of material;

Fig. 6 is a sectional view taken on line 6—6 of Fig. 3;

Fig. 7 is a side view, partly in section and with parts broken away, showing a portion of a fruit sorting device, together with means for controlling the direction of flow of the output thereof;

Fig. 8 is an enlarged side view, partly in section and with parts broken away, of portions of the apparatus shown in Fig. 3 and comprising mechanism for diverting out of the system an excess of fruit;

Fig. 9 is a plan view, partly in section, of the upper portions of the apparatus shown in Fig 8 showing in detail a fruit deflector arrangement employed therein;

Fig. 10 is a fragmentary sectional view taken substantially on line 10—10 of Fig. 8;

Fig. 11 is a front elevation, partly in section and with parts broken away, of a bag packer unit employed in the present apparatus;

Fig. 13 is a detailed front elevation, partly in section and with parts broken away, of portions of the righthand packer unit shown in Fig. 11, indicating portions of a device for deflecting the flow of objects toward or away from the packer unit and also portions of means for counting the objects which are to be packed into a bag;

Fig. 14 is a sectional view taken substantially on line 14—14 of Fig. 13;

Fig. 15 is an enlarged detailed view, partly in section and with parts broken away, of said counting mechanism and flow-deflecting mechanism;

Fig. 16 is a front elevation of the apparatus shown in Fig. 15;

Fig. 18 is a side elevation, partly in section and with parts broken away, of a unit for filling open mouth bags which can be employed in the present invention;

Fig. 19 is a front elevation of one type of means for clamping an open mouth bag onto the packer unit shown in Fig. 18, the clamping means being shown in an open position;

Figure 12:
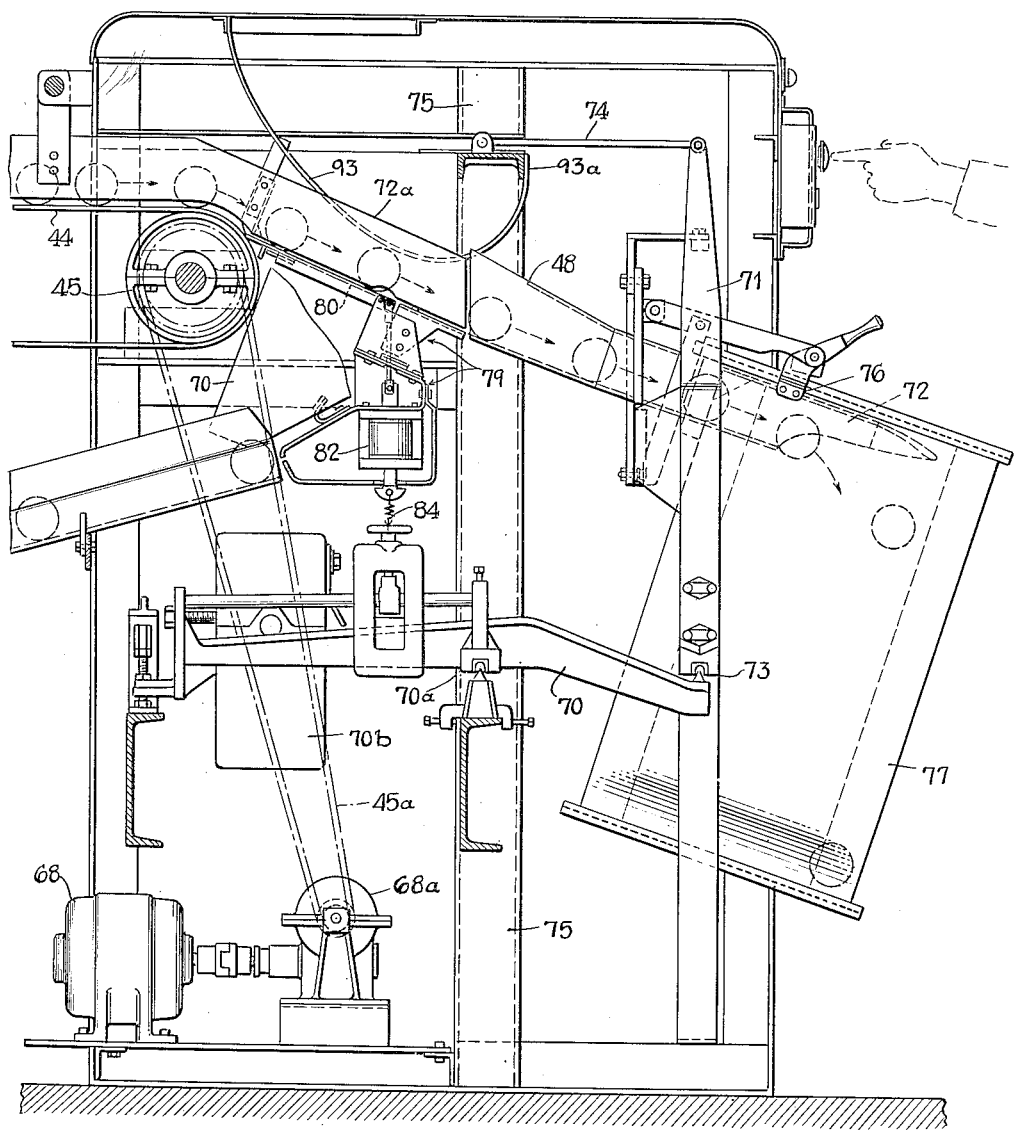
Fig. 12 is a sectional view taken substantially on line 12—12 of Fig. 11.

Fig. 20 indicates the bag clamping means of Fig. 19 in a closed position;

Fig. 21 is a plan view of the bag clamp and an associated filler tube as shown in Fig. 18;

Fig. 22 is a plan view of another form of the invention; and

Fig. 23 is a side view partly in section and with parts broken away of the apparatus shown in Fig. 22.

The invention in one aspect thereof comprises a device for packing oranges into containers such as paper bags instead of wooden crates. A packer unit is employed having a channel member or filling tube with which the bag is held in filling relation. The oranges pass through the filling tube into the paper bag which is held in said filling relation with the tube, for example, by means of a clamp. A predetermined quantity of oranges can be filled into the bag, the quantity being determined by weight or by count of the individual oranges.

For determining the proper weight of fruit, a weighing device is preferably employed in connection with the filling tube whereby the flow of oranges thereto is interrupted in response to a weighing movement of the weighing device.

The interruption of flow to the bag can be effected by, for example, a cut-off gate which can be actuated in a well known manner.

The means for determining the quantity by count can be constituted by any suitable device of this nature, for example, a so-called electric eye or photo electric cell counter which can actuate the flow arresting means after a preselected number of oranges have been counted. Instead of an electric eye counter, mechanical means can be used which can be actuated by each passing orange, and after a preselected number of actuations the flow arresting means can be actuated.

In order to achieve a high output of filled bags per hour, it is desirable to direct to the bag while on the filling tube, a stream of oranges which is as nearly uniform as possible. However, as a matter of practice, this stream is intermittent and subject to surges largely because the outflow from the sorting device which feeds the novel packing system is intermittent and surging. The present invention provides means for overcoming the disadvantageous effects of such surges as will appear more fully hereinafter.

It is desirable for the orange sizing device to operate continuously once the apparatus has been put in motion, and for bags to be applied to the packer as quickly as possible. After a bag has been filled to a desired weight, or count, the flow of oranges should be interrupted in such a manner that it can be quickly started again and in such a manner that it is unnecessary to cease the operation of the orange sorting device. After a bag has been filled and the flow of fruit thereto temporarily interrupted, suitable means are provided for disposing of the oranges during this period of interruption while a new bag is applied to the packer unit. Thus, the danger is eliminated of flooding the apparatus with oranges during the short period of interruption of the flow to the bag. However, the orange sorting device continues in operation.

Figure 1:
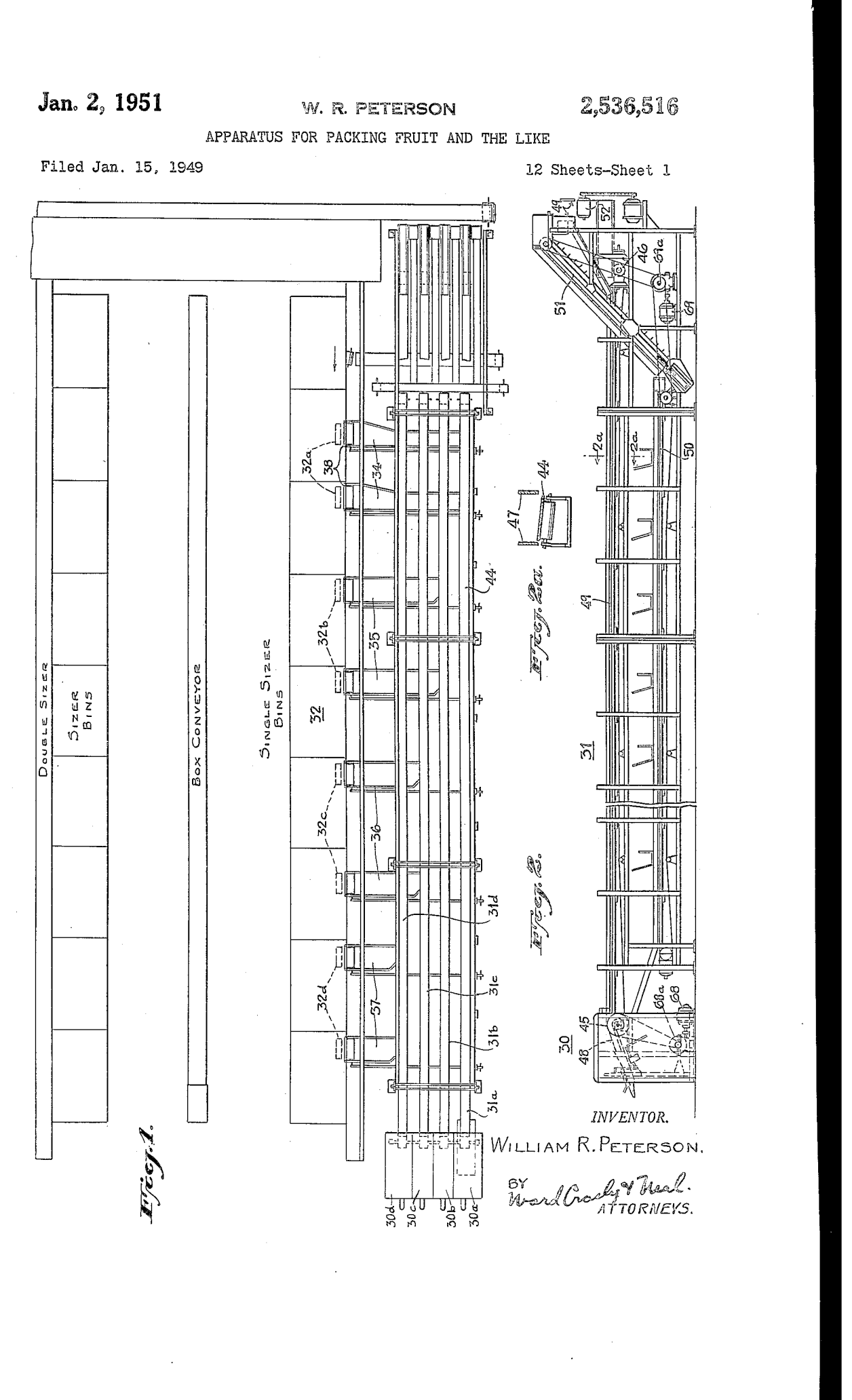

A preferred form of the invention shown in the drawings is constituted by two main parts which cooperate closely, namely, a bag packer 30 and a fruit conveyor system 31, the latter being adapted fo directing a stream of fruit from a sorting or sizing device 32 to said packer 30. The sizer device 32, in the form shown, is adapted for dividing the oranges into, for example, four separate sizes and consequently the form of the invention illustrated is provided with a corresponding number of separate packer units, one for each size, and a like number of separate conveyor systems. The four separate packer units are indicated as at 30a, 30b, 30c and 30d (Fig. 1) and their respective conveyor systems are respectively indicated at 31a, 31b, 31c and 31d. In view of the fact that each of the separate packer units and its respective conveyor system is identical to the other, only one such packer unit and its cooperating conveyor system will be described. Of course, the sizer can sort more than four sizes, for example, eight, and a corresponding number of packers and conveyor systems can be used therewith. The number of packers and conveyor systems will normally correspond to the number of sizes which are sorted. However, it is possible, for example, to use a sorter which can separate eight sizes in combination with, for example, four packers and conveyor systems. In the latter case, two different sizes can be packed by each packer.

Sizing device

With respect to the sizer device 32, the principle of operation and the general construction thereof is indicated in Fig. 7. This device can be of any well known variety and, in the form shown, is constituted by a sizer belt 33 which lengthwise is substantially horizontal but cross-wise or transversely is tilted at an angle of approximately 45° toward a plurality of sizer rolls which are situated along the length of the belt. The latter moves the oranges past these sizer rolls. Each sizer roll is held at a preselected distance from the belt, the smallest distance being first encountered by the oranges and so on, whereby the small oranges are discharged first and thereafter the next succeeding sizes. The sizer rolls are preferably rotated by power means. In the type of sizer device shown in the drawings (Figs. 1 and 7), there are two sizer rolls for each unit of size of orange to be discharged therefrom. The first pair of sizer rolls is indicated at 32a, the belt 33 moving the oranges past same in the direction of the arrow as shown. One of these rollers 32a is indicated in Fig. 7 wherein there is illustrated the manner of cooperation between said sizer belt 33 and said roll. The oranges which are capable of passing between the roll 32a and the belt 33 will be discharged therefrom into a chute 34 and thence onto the respective conveyor system to be described hereinafter. There are, of course, two chutes 34, one for each of the sizer rolls 32a.

Analogous pairs of sizer rolls at progressively increasing distances from the sizer belt, are indicated (Fig. 1) at 32b, 32c and 32d. The roll situated at the greatest distance from the sizer belt is adapted for disposing of the largest expected size. Experience in adjusting the machine can clearly indicate what such largest size may be and there is no difficulty in disposing of or sizing all sizes of objects. Chutes 35, 36 and 37 are indicated for directing oranges passing rolls 32b, 32c and 32d respectively into their respective conveyor systems.

It may be desired to divert the flow of fruit from the sizer away from its respective conveyor system and into a suitable bin, for example, for manual packing. A flow diverting device for the above purpose is indicated in Fig. 7 and is constituted by a sizer deflector 38 which is pivotally mounted at 39. When said deflector is angularly shifted in a clockwise direction from the position shown in Fig. 7, said diversion of the sizer output can be effected. Any suitable means for controlling said sizer deflector can be employed, for example, a manual control device constituted by a hand rod 40 having a handle 41 and associated with the deflector 38 by means of a pivotal connection at 42 and an arm 43, the latter being rigidly attached to the deflector.

*Conveyor system*

One of the conveyor systems as 31a will now be described. I have discovered that in order to attain a high output of filled bags per hour it is desirable to form the rollable objects such as oranges in a column upon a fast moving conveyor and directing the objects discharged by the conveyor at one extremity thereof into a bag packer unit as at 30a (Fig. 1). In order to form the oranges into a satisfactory column and in order to move the fruit at a desired speed, a main or packer conveyor 44 (Figs. 1, 2, 2a) is employed which in the form shown is constituted by an endless belt. The endless belt is stretched between a pair of head pulleys 45 and 43 which, for example, can be about eight inches in diameter. The length of the upper run of the endless belt 44 preferably is sufficiently long to permit the accumulation of a desired number of oranges thereupon. In order to insure that the oranges are formed in a column, the upper run of the belt 44 is tilted toward a sidewall 47 which is employed in combination therewith as indicated in Fig. 2a. Thus a substantially V-shaped trough is formed toward the bottom of which the oranges are urged by gravity and along which they are moved by means of the belt 44. If desired, the sidewall toward which belt 44 is tilted can be movable in the same direction and preferably at the same speed as belt 44, in order to assist the motion of the fruit toward the packer unit 30a. Such a movable sidewall can comprise an endless belt analogous to belt 44.

The alignment of the fruit upon the conveyor 44 in a perfect column, or substantially perfect, tends to eliminate the danger of the oranges forming in a zigzag thereupon and becoming jammed or clogged whereby the oranges may overflow the sidewall and possibly render the apparatus inoperative.

The discharge extremity of the main conveyor 44, that is, the left extremity as viewed in Figs. 1 and 2, discharges into a suitable passage member 48 of the packer 30a, and thence the fruit passes to, for example, a paper bag which is held in filling relationship with said passage member. When the bag has received a predetermined quantity of fruit, the flow thereof is interrupted by a suitable cut-off gate to appear more fully hereinafter and the main conveyor 44 is arrested.

The feeding means for the main conveyor 44, in the form shown, is constituted by means for transporting the output of the sizer device 32 to said main conveyor via a surplus or overflow control device which is herein referred to as a main deflector unit 49. The function of the latter unit is to sense an overload condition on the main conveyor 44 and to divert the oncoming stream of oranges therefrom and, for example, onto a surplus removal conveyor or to any suitable surplus removal means. The output of the sizer device in normal operation usually constitutes an intermittent stream. It is not considered practical to arrest the operation of the sizer device in response to an overload condition in the conveyor system and consequently the outflow from said sizer device proceeds and when an overload occurs upon the main conveyor 44, the oncoming stream from the sorter is diverted as above mentioned.

The means for transporting the sorter output to the main deflector unit 49 are constituted, in the form shown, by a subsidiary conveyor 50 below the main conveyor 44 (Fig. 2), which subsidiary conveyor conveys the objects onto an elevator or lift conveyor 51 which raises the stream to a drop-off point above the deflector unit 49, thereby facilitating the operation of the latter. It is, of course, not necessary for the subsidiary conveyor 50 to be below the main conveyor 44, as shown, nor is it necessary to employ the elevator 51. However, it is found convenient to make use of this arrangement because it is usually found that in packing plants the sorting apparatus is at a relatively low level. Thus it is desirable to elevate the output of such sorting device to a desired degree to take advantage of the force of gravity in governing the oncoming stream of objects from the sorter. Thus it would be possible to locate the subsidiary conveyor 50 at a superior elevation relative to the main conveyor 44 whereby the discharge or drop-off point from such subsidiary conveyor would be at a desired higher location relative to the main deflector unit 49.

The subsidiary conveyor 50 preferably is tilted transversely toward one of the sidewalls or guides employed therewith, in a manner analogous to that of the main conveyor 44 as illustrated in Fig. 2a, thereby assisting in forming the objects thereupon in a column.

The subsidiary conveyor 50 is generally analogous in construction to the main conveyor 44. In the form shown, the subsidiary conveyor 50 is somewhat shorter than the main conveyor, whereby the discharge or drop-off point thereof is positioned to assist in the location of the elevator conveyor 51.

The elevator 51 also is preferably of the endless belt or chain variety and is provided with a plurality of so-called buckets or compartments each of which is adapted for receiving an object such as an orange. The elevator 51 transports the oranges to the crown or peak thereof from which they fall past the deflector unit 49 either: (1) onto the main conveyor 44; or (2) onto a discharge device such as a surplus removal conveyor 52 (Figs. 2 and 3). The latter is also referred to as an overflow conveyor. The conveyor 52 preferably is situated transversely relative to the elevator, and transports the oranges, for example, back to the sizing device, back to the main source of supply, or to an entirely different packing system. A motor 52a (Fig. 3) drives said conveyor 52.

Deflector unit 49 is constituted by an angularly shiftable deflector plate 53 (Figs. 3 and 8) which is normally in a vertical position whereby the discharge from the lift conveyor 51 can drop onto an inclined chute 54 and thence onto the main conveyor 44. The deflector plate 53 is angularly shiftable, in response to an overload condition upon said main conveyor 44, to the position shown in broken lines (Fig. 3) whereby the stream of oncoming objects is diverted away from said inclined chute 54 and onto the surplus removal conveyor 52.

Suitable means are provided for sensing an overload condition upon the main conveyor 44 whereby the deflector 53 is so controlled, comprising said inclined chute 54 which has the lower extremity thereof in close proximity to the main conveyor 44 thus allowing objects upon the latter conveyor to "back up" and accumulate progressively upwardly upon said inclined chute. When r sufficient weight of objects accumulate on the chute, the latter is adapted for actuating the deflector plate 53 as will appear below. Chute 54 is pivoted at 55 (Figs. 3 and 8) and is adapted for slight angular movement in response to a preselected weight of objects thereupon. This slight angular movement is adapted for actuating, for example, a micro-switch 56a, which controls a solenoid 56, the latter being operatively connected to the deflector plate 53.

The inclined chute 54 is urged in a clockwise direction, for example, by means of a spring 57 which exerts a thrust upon a rod 58 which is pivotally secured to said inclined chute 54. Thus the extent of the overload to which the "back up" or overload sensing means will react can be governed by adjustment of the compression of spring 57. Also, chute 54 is of substantially V-shaped cross-section in order to constrain the oranges to move in column.

The deflector solenoid 56 is operatively connected to the deflector plate 53 by any suitable means, for example, by a rod 59. When the solenoid 56 is deenergized, gravity is effective to urge the deflector plate into its normal position, namely, substantially vertical as viewed in Figs. 3 and 8.

The inclined chute 54, as shown in Fig. 8, is constituted by a pair of inclined sidewalls 54a and an inclined floor of the chute. If desired, only the latter need be pivoted as at 55 and the sidewalls 54a can be fixed.

The deflector unit preferably is provided with a suitable housing member 60 (Figs. 8, 9 and 10) having an outlet as at 60a opening upon inclined chute 54, there being suitable guide plates for diverting the falling objects in the direction of the arrows 61 (Fig. 9) and onto the inclined chute 54 provided the deflector plate is in its vertical position (Fig. 8). The housing 60 also is provided with a surplus discharge opening 60b through which the objects are discharged onto the above-mentioned surplus removal conveyor 52, when the deflector plate 53 is in its inclined position, as shown in broken lines in Fig. 8, the objects following the path indicated by arrow 62.

The subsidiary conveyor 50 preferably is directly beneath its respective main conveyor 44 and consequently the lift conveyor 51 must be positioned to one side of the subsidiary conveyor 50 in order to avoid the main conveyor. Thus, as shown in Fig. 4, the objects are directed to one side of the subsidiary conveyor 50, as they are discharged therefrom and thence onto the elevator 51.

In order to aid in removing any surplus objects which are not lifted promptly by the elevator conveyor 51, suitable overflow or overload chutes are provided for the subsidiary conveyor as indicated in Figs. 3 and 4. Besides the lift conveyor 51 there is an inclined overflow chute 63 onto which move objects which are not promptly engaged by the elevator conveyor 51. A transversely disposed and transversely tilted overflow cross-belt 64 (Figs. 3, 4 and 6) is employed for moving any such overflow objects out of range of the elevator conveyor 51. The cross-belt 64 is of the endless belt variety, the lower run of which is transversely tilted and the upper run of which is substantially horizontal and employed in a manner to be described hereinafter for assisting in removing overflow oranges or objects from the upper or main conveyor 44.

Objects which are not immediately engaged and elevated by the elevator conveyor 51 thus are urged by said lower run of the belt 64 into the inclined overflow passages 63 and thence moved by gravity onto any suitable removal means such as a belt 65 upon suitable pulleys 66 (Figs. 3 and 4).

In addition to the means for relieving an overload condition upon the main conveyor 44 comprising the above-described deflector unit 49 and the inclined chute 54, there also may be employed an overflow discharge device comprising opening 47a (Figs. 3, 5 and 6) (in one of the sidewalls 47 for the main conveyor 44) and a baffle 67a for directing such overflow into a chute 67. When objects become jammed upon the main conveyor 44 and between sidewalls 47, they may pile up to a point opposite the opening 47a and the oncoming objects thereupon may strike the last object in the jam, be deflected through the opening 47a, against baffle 67a, and into the chute 67 through which they may be directed, for example, onto the subsidiary or lower conveyor 50.

In order to assist in preventing fruit from escaping through sidewall opening 47a when no overload condition exists, it is desirable for chute 54 to be longer as shown by broken lines 54a (Fig. 3) so that its lower extremity will be not more than about two feet to the rear of the opening 47a on the scale as shown in Fig. 3. When a bag upon the filling machine becomes full and the belt is automatically stopped, by means to be more fully described hereinafter, it has been found that the last fruit in the column of fruit on the top belt 44 will be about five or six feet forward of the lower extremity of the chute 54a (Fig. 3). Thus said last fruit will be several feet forward of the sidewall opening 47a. Thereafter as fruit comes down the chute 54a, it will pick up enough speed to carry it up to said last fruit resting on the belt and although the belt 44 is tilted toward the sidewall opening 47a, the fruit will have sufficient momentum to carry past said opening. However, when the fruit on the top belt "backs up" to said opening 47a, any additional fruit thereupon will be directed through the opening.

The upper run of the belt 64 can be employed for assisting in moving such overflow objects through the passage 47a and into the chute 67. The upper run of said belt moves in the direction of the arrows, as indicated in Figs. 5 and 6, and passes under the main conveyor 44, a section thereof as at 64a being adapted for so assisting in removing overflow objects.

In order to aid in emptying the system, deflectors 47b pivoted at 47c (Fig. 5) may be employed for diverting the flow of objects into passage 47a.

Preferably separate power means are provided for moving each of the main conveyors 44, but common power means are provided for actuating the subsidiary conveyors 50 together and their respective elevator conveyors 51. In the form shown, each main conveyor 44 is powered by a separate electric motor 68 (Fig. 2) through the intermediary of a suitable speed reducing gear 68a. The subsidiary conveyors 50 and their respective elevator conveyors 51 are jointly powered by a common electric motor 69 and also through a suitable reduction gear 69a (Figs. 2 and 3). Any suitable means, such as sprocket chains, can be provided for operatively connecting the above-mentioned speed reduction gears to their respective conveyors.

As shown in Fig. 11, the above-mentioned head pulley 45 is driven by the motor 68 which actuates the speed reducing device 68a. The latter can be connected to the head pulley by means, for example, of a sprocket chain 45a which passes over suitable sprocket wheels connected respectively to the speed reducer and the pulley 45.

The bag packer 30 will now be described, as indicated in detail in Figs. 11–16, inclusive. The packer unit 30a, for example, is adapted for packing the objects such as fruit in accordance with weight or count. With reference to packing by weight, a weighing device is provided comprising a scale beam 70 upon which is mounted in a well known manner a so-called A-frame 71 for supporting a bag filling tube 72, the latter being adapted for undergoing weighing movement with the scale beam and comprising a part of the above-mentioned passage member 48 (Fig. 2). The scale beam is mounted upon suitable knife edges as at 70a and is provided with a weight 70b, the position of which can be varied toward or away from one side of the knife edge support 70a in order to make adjustment for bag charges of different weights. The A-frame 71 rests upon the scale beam 70 by means of knife edges 73 and is constrained to vertical movement by means of a rod 74 which is pivotally secured to the A-frame and to a main frame 75 of the packer unit.

A bag clamp 76 of conventional variety is employed for holding a bag, such as a valve bag 77, upon the filling tube 72.

Fruit which is discharged from the main conveyor 44 into the packer unit 30a is conveyed to the filling tube 72 by means of a conduit 72a which also constitutes a portion of said passage member 48, the latter being constituted by members 72 and 72a.

A flow arresting means is provided for interrupting the flow of fruit to the bag 77 comprising a packer deflector or cut-off unit 79 (Figs. 12 and 14). This is constituted by, for example, a packer deflector blade 80 which comprises a portion of the floor of the conduit 72a. The packer deflector blade 80 is pivotally mounted at 81 and is angularly shiftable by a packer deflector solenoid 82 which is connected thereto by means of a rod 83.

The packer deflector blade 80 normally is in the position shown in solid lines in Figs. 12 and 14 because of the action of a spring 84 which may be associated with the solenoid 82 and which urges same downwardly, as viewed in Fig. 14, thereby yieldingly holding the deflector blade 80 in its normal position whereby fruit can pass to the filling tube 72.

When packing by weight, the deflector blade solenoid 82 is placed under the influence of the scale beam 70 and is energized in response to weighing movement of the weighing device through the intermediary of a micro-switch 85 (Fig. 11) which is preferably normally open but which is held closed until said weighing movement. The operation of this switch will appear more fully hereinafter.

When packing the bag 77 by count, the scale beam 70 is locked with the weight 70b in a down position and a suitable counting device is employed for energizing the solenoid 82 after a preselected number of objects have passed the counting device.

It has been found desirable to arrest immediately the movement of the main conveyor 44 simultaneously with the energizing of the solenoid 82.

When the deflector blade 80 is moved to the position shown in dotted lines in Fig. 14, some objects upon the main conveyor 44 will have sufficient momentum to continue in motion, whereupon they will fall in the direction indicated by the arrow 86 and be diverted onto an inclined return chute 87 which will return the objects to the lower or subsidiary conveyor 50. The inclined return chute is preferably of substantially V-shaped cross-section in order to maintain proper alignment of the fruit.

A limit stop or bumper 88 is fixed in position beneath the deflector blade 80 for supporting the latter in its lowermost position. An upper limit stop 89 aligns the deflector 80 in its proper normal position.

In a manner to appear more fully below, each motor 68 is stopped at the same time that its respective packer deflector blade or cut-off gate is tripped, that is, shifted to the down position as shown in broken lines in Fig. 14.

Figure 17:
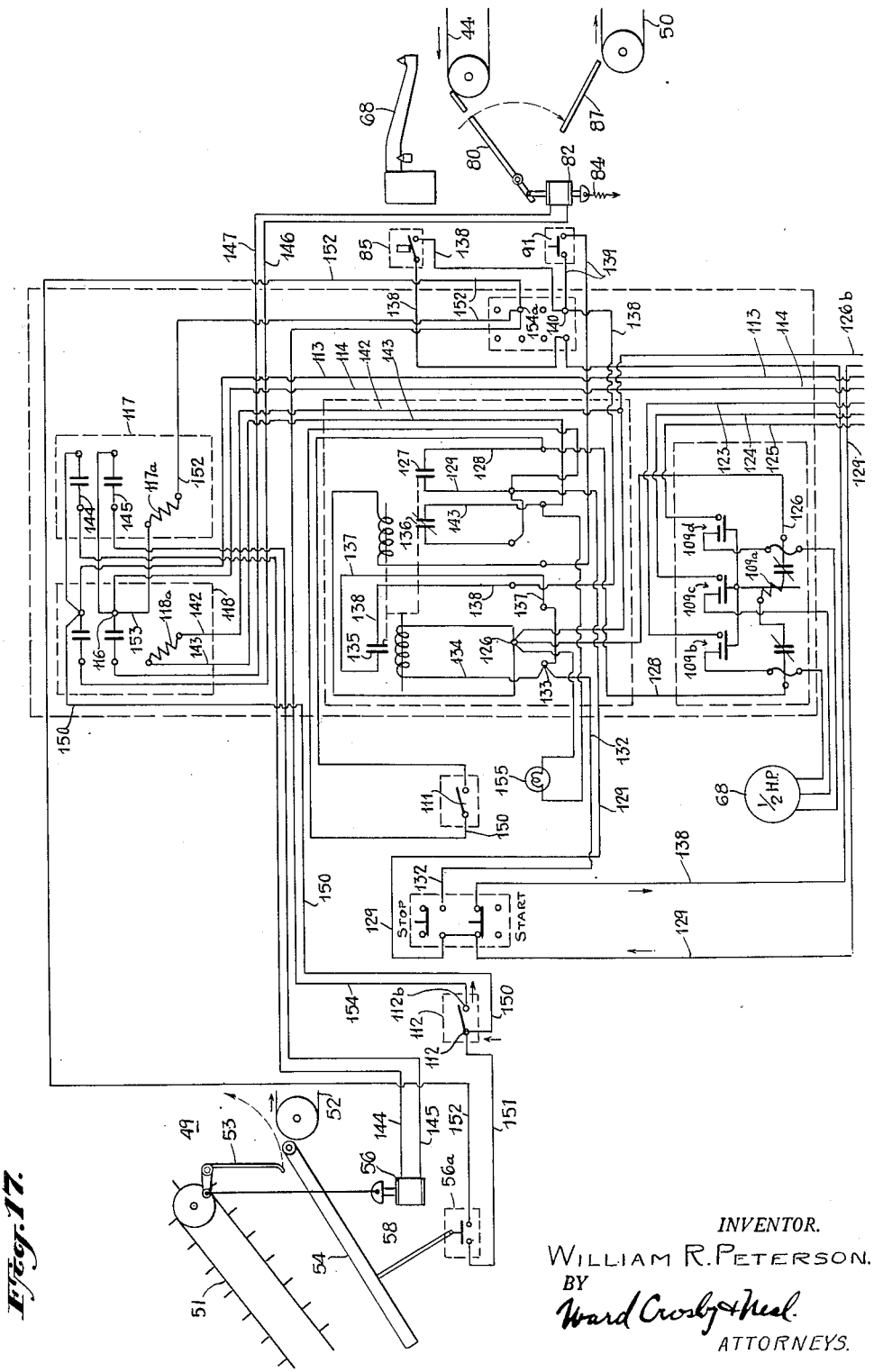
Fig. 17 is a wiring diagram illustrating schematically one example of the electrical interconnections of the electrically operable elements of the present invention.

The above-mentioned counting device is constituted, in the form shown (Figs. 15, 16 and 17), by an electro-mechanical device having a counter finger 90, a portion 90a of which projects through a suitable opening, for example, in the floor of the passage member 72a, and is contacted by each passing orange or other object, thereby angularly shifting same a slight amount. A micro-switch 91 is closed each time the finger 90 is so shifted, thereby completing a circuit to be described hereinafter which permits the passage of an electric impulse to a counter coil 92 (Fig. 17). After a preselected number of impulses have been transmitted to said counter coil, the deflector solenoid 82 is energized, as will appear below.

In order to insure positive action of the counting means, a curved flexible strip 93 is positioned, as shown in Fig. 14, in such a manner that it yieldingly urges the passing objects down against the counter finger 90. The flexible strip preferably is fixed mounted at one extremity thereof as at 93a and is free at the opposite extremity.

If it is desired to fill open mouth bags of the type indicated at 94 (Figs. 18 and 20), the type of filling tube should be adapted thereto. Instead of the filling tube as at 72 (Fig. 12), a filling tube 95 is provided with a bell, as at 96, which is substantially of larger cross-sectional area than an inlet conduit 97 thereto. The bell 96 is directed downwardly and deflects the oncoming objects into the bag 94. The latter may be held in filling relationship with the bell 96 by means of suitable clamps as at 98 (Figs. 19–21) which are mounted for pivotal movement adjacent said bell 96 as at 99 and are operatively connected by a conventional mechanism for actuating the clamps simultaneously, said mechanism comprising, for example, a handle 100 which controls the angular position of a central lever 101 to the extremities of which arms 102 are connected which operatively associate same with the bag clamps 98. When the handle 100 is angularly shifted to the position as shown in Fig. 20, the arms 102 are urged upwardly and toward the bell 96 to press clamp 98 against said bell.

The handle 100 (Fig. 18) and the handle of the bag clamp 76 (Fig. 12) can be operatively associated with the solenoid 82 and the cut-off gate 80 in such a manner that the bag 77 or 94 can be automatically discharged simultaneously with or a predetermined time after the closing of said cut-off gate.

Wiring diagram

One example of the means for electrically interconnecting certain of the parts above described is shown in Fig. 17 which also schematically shows the operative interconnection between various of the elements of the apparatus.

*Motor (69) for subsidiary conveyor (50) and elevator conveyor (51).*—This electric motor is preferably of the three-phase variety and is adapted for running continuously. It is not under the influence of any of the other elements of the apparatus, and is electrically connected to power lines, $L_1$, $L_2$ and $L_3$, for example, through the intermediary of an individual starter switch 103, a motor disconnect device 104 and a master disconnect switch 105, all of which may be manually controlled. The master disconnect switch is for disconnecting all power to the apparatus with certain exceptions as set forth below. The motor disconnect switch 104 is adapted for disconnecting only the motors 52a, 68 and 69.

*Overflow conveyor motor (52a).*—This motor is electrically connected to the main power lines $L_1$, $L_2$, and $L_3$ through a manual starter switch 106, said motor disconnect switch 104, and the master switch 105.

*Main conveyor motor 68.*—The main conveyor motor 68 is under the influence of: (1) weighing movement of the scale beam 70 through the intermediary of the scale beam micro-switch 85; (2) the fruit counting mechanism through the intermediary of said counter micro-switch 91 and counter device 92; (3) a starter push button 107 which is adapted for closing starter contacts 108 to actuate a starter relay 109; (4) a stop push button which is adapted, for example, for arresting said motor in an emergency by a momentary opening of stop contacts 110; (5) when it is desired to empty the main conveyor 44 without packing any of the objects thereupon into a container, it is necessary to energize motor 68 and to actuate cut-off gate or deflector 80, whereby any objects upon the main conveyor are discharged therefrom and directed onto the subsidiary or lower conveyor 50. A so-called conveyor emptying switch or stripper switch 111 is provided for this purpose which is adapted for simultaneously energizing the cut-off gate solenoid 82 and the motor 68.

*Bag feed cut-off gate 80.*—This gate is, of course, under the influence of solenoid 82 which in turn can be energized in response to: (1) weighing movement of the scale beam; or (2) a preselected number of counter impulses; or (3) a closing of the above-mentioned conveyor or emptying switch 111.

*Overflow deflector unit 49.*—This unit is responsive to a preselected weight of material upon the inclined chute 54, the response being effected through the micro-switch 56a which governs the energization of the deflector solenoid 56. Deflector solenoid 56 is also under the influence of a manually operated switch 112 which is adapted for completing a circuit to said solenoid, whereby any objects upon the lower or subsidiary conveyor and the elevator conveyor can be diverted to the overflow conveyor 52 when it is desired to empty the lower belt, for example, when it is desired to change the type or size of the object being packed.

The above-mentioned electric motors 52a, 68 and 69, respectively, can be, for example, of 2, 3, and ½ H. P., respectively, and thus preferably employ a relatively high voltage such as 220 v., 60 cycle. This power is communicated by the above-mentioned power leads $L_1$, $L_2$ and $L_3$ which are connected to a suitable source of electric energy (not shown). It had been found desirable to energize the overflow deflector solenoid 56 and the cut-off gate solenoid 82 by connecting same, for example, across the power leads $L_1$, $L_3$, as shown in Fig. 17. Suitable solenoid main power leads 113, 114 are provided for this purpose which are connected to solenoid power terminals 115 and 116, respectively. Power is conducted to said solenoids 56 and 82 through the intermediary of relays 117 and 118, respectively, in a manner to appear more fully hereinafter.

A manually operable solenoid disconnect switch 119 is interposed in the leads 113, 114.

Certain of the electrical elements indicated in Fig. 17, for example starter control coil 109a and other relay coils, preferably are operated on 110 v., 60 cycle current. Leads 120, 121 are connected to a suitable source (not shown) of such power through the intermediary of a manually operable double pole switch 122. Electrical energy from these leads is conducted to the relay coils of the various relays in the apparatus as will appear hereinafter. The output terminals of said switch 122 are indicated at 122a, 122b.

Referring now to the starter 109 for the main conveyor motor 68, this device can be of well known design, including the starter relay coil 109a which governs jointly three sets of starter subswitches or contacts 109b, 109c and 109d by solenoid action. The latter three subswitches are interposed in three leads 123, 124, and 125, respectively, which are connected to the above-mentioned motor disconnect switch 104.

Thus, the energization of the main conveyor motor 68 is governed by the starter relay coil 109a. The latter at one extremity thereof, by means of a lead 126, is connected to a 110 volt power terminal 126a, the latter being directly connected by a lead 126b to the above-mentioned 110 volt terminal 122a. The opposite extremity of the relay coil 109a is connected to the other 110 volt terminal 122b through a normally open switch 127, the latter being under the influence of a so-called clutch coil and the start button 107, as will appear below. The electric circuit between said opposite extremity of the relay coil 109a and terminal 122b is constituted by lead 128 interconnecting coil 109a to the switch 127, lead 129 which interconnects said last-named switch to said terminal 122b. One of each of the pairs of start and stop contacts 108, 110 are connected to said lead 129 for a purpose also to appear below.

From the above, it will be seen that normally the starter relay coil 109a is deenergized and hence the motor 68 is inactive. This is because said switch 127 is normally opened and is not closed until actuated by the above-mentioned clutch coil which is shown as at 130.

The latter can be energized by pressing the start button 107. Thus, the chain of events in actuating starter 109 is as follows: the start button 107 is pushed; the clutch coil 130 is energized; the normally open switch 127 is closed; the starter relay coil 109a is energized as a result of the completion of the circuit thereof by the closing of switch 127, and the motor 68 is started because the subswitches 109b, 109c and 109d are closed by the solenoid action of coil 109a.

The clutch coil 130 at the first extremity thereof is connected by a lead 131 directly to the input power terminal 126a and thence by lead 126b to the terminal 122a of the 110 v. switch 122. The opposite extremity of the clutch coil 130 is connectable to the other contact 122b of the 110 volt switch 122 through either of two circuits. The first circuit is through the momentarily closed start switch 107, which closes the second or locking circuit which remains intact until proper weight or count is reached whereupon said locking circuit is automatically broken in a manner to appear hereinafter. The locking circuit has therein both the scale beam micro-switch 85, and the counter micro-switch 91. Said first circuit through start switch 107 includes that portion of lead 129 between contact 122b and said start switch 107; a lead 132 to a terminal 133; a lead 134; coil 130; and leads 131 and 126b. The second or locking circuit will be explained below.

The clutch coil 130 is operatively associated, for example, by suitable mechanical linkage with: (a) the above-mentioned relay coil control switch 127; (b) a locking circuit switch or interlock switch 135; and (c) normally closed switch 136 which governs the energization of the above-mentioned relay 118 for the cut-off gate solenoid 82.

The so-called interlock switch 135 is electrically associated with the clutch coil circuit, for example, by means of a lead 137 interconnecting one side of said switch to the terminal 133, and a lead 138 which is directly connected to one of the contacts of the normally closed stop switch 110 and thence to lead 129. Thus when the start switch 107 has been opened after a momentary closing, the clutch coil 130 remains energized because of the action of the interlock switch 135 which, when closed, maintains the locking circuit through such clutch coil across the 110 volt terminals 122a, 122b. Said locking circuit, starting at terminal 122a, is constituted by lead 126b, lead 131, coil 130, lead 134, lead 137, switch 135, lead 138, stop switch 110, and that part of lead 129 between said stop switch and terminal 122b.

Interposed in the lead 138 is the above-mentioned scale beam micro-switch 85. Thus so long as the scale beam micro-switch 85 is closed, the so-called locking circuit for the clutch coil 130 will be complete, the starter relay coil control switch 127 will be closed, and the normally closed switch 136 (for cut-off gate relay) will be opened, thereby deenergizing the relay 118 and also the cut-off deflector solenoid 182. It will be apparent that when weighing movement occurs as a result of a desired weight of objects being discharged into a bag, the micro-switch 85 will open and break the interlock circuit of the clutch coil 130, thereby opening switch 127 (controlling relay 109 of motor 68) and closing switch 136, thus respectively stopping main conveyor motor 68 and energizing solenoid 82 of the cut-off deflector 80.

The counter coil 92 is operatively connected to the interlock switch 135 by suitable linkage, and a counter mechanism (not shown) included in such operative interconnection is adapted for opening the interlock switch 135 in response to a preselected number of electrical impulses directed to said counter coil 92. One means for interconnecting the counter coil 92 into the 110 volt circuit is by means of a lead 139 which interconnects one extremity thereof to the lead 138 as at the terminal 140 which is located between the scale beam micro-switch 85 and the interlock switch 135; and by a lead 141 which directly connects the opposite extremity of the counter coil to the power terminal 126a and thence to the power terminal 122a via lead 126b. The above-described counter micro-switch 91 is interposed in the lead 139.

The electric circuit of the counter coil for counting purposes is thus constituted by that portion of the lead 129 between terminal 122b and the stop switch 110, thence through the lead 138, the scale beam micro-switch 85 to terminal 140, and thence through lead 139, the counter micro-switch 91 through the counter coil 92, leads 141 and 126b. When a preselected number of impulses have reached the counter coil 92, the mechanism associated therewith opens the interlock switch 135 and thereby accomplishes the result similar to the opening of the scale beam micro-switch 85. That is, the clutch coil 130 is deenergized, switches 127 and 136, respectively, are opened and closed, thereby shutting off the motor 68 and energizing solenoid 82, energization of the latter, of course, being effective angularly to shift the cut-off gate 80 to arrest the flow of fruit to the bag. Any fruit on the gate and any fruit having sufficient momentum on the belt 44 is directed down into the return chute 87 and thence to the lower conveyor 50.

Relay coil 118a is connected across leads 126b, 129 (and thence to power terminals 122a, 122b) by leads 142, 143, respectively. Normally closed control switch 136 for relay 118 is interposed in lead 143.

Electrical energy for the two solenoids 56 and 82 is directed to the above-mentioned power terminals 115, 116 by means of said leads 113 and 114. Solenoid 56 is connectable to said power terminals 115, 116 by means of leads 144 and 145, respectively, through the intermediary of said relay 117. Cut-off gate solenoid 82 is analogously connectable to said power terminals 115 and 116 by means of leads 146 and 147 through the intermediary of the relay 118.

It has been mentioned above that it is possible to empty the upper belt 44 of any objects thereupon without packing same into a container by means of a manually controlled switch 111. The latter is adapted for short circuiting the switch 127 which controls relay 109 of motor 68, that is, switch 111 is adapted for accomplishing the same effect as the closing of switch 127 without disturbing any of the other elements of the apparatus. For this purpose leads 148 and 149, respectively, interconnect opposite sides of said switch 127 and the switch 111.

It has been mentioned above that the overflow deflector solenoid 56 is under the influence of a micro-switch 56a which is closable in response to a preselected weight of objects upon the inclined chute 54. Said micro-switch 56a is normally open. The relay 117 for said solenoid 56 is governed by a relay coil 117a in a manner analogous to the relays above described and the electric circuit for said relay coil 117a, which includes the micro-switch 56a, is traced from terminal 115 to 116 as follows: A lead 150 which interconnects terminal 115 to a terminal 112a of the manually controlled switch 112; a lead 151 interconnecting the latter terminal with one side of the micro-switch 56a, a lead 152 which interconnects the other side of said micro-switch to one extremity of the coil 117a, and a lead 153 which interconnects the opposite extremity of said coil to the terminal 116. Thus it is apparent that the coil 117a is energized whenever the micro-switch 56a is closed.

It is also desirable for the deflector unit 49 to be actuated in response to the closing of the manual switch 112 whereby the lower belt can be cleared of fruit without directing same onto the upper belt. Consequently, switch 112 is so connected in the circuit of the coil 117 that the deflector solenoid 56 is energized whenever said switch 112 is closed. For this purpose a second terminal 112b of switch 112 is connected by means of a lead 154 to the lead 152. Thus whenever the switch 112 is manually closed, a circuit for the relay coil 117a is completed between power contacts 115 and 116 as follows: lead 150 between power terminal 115 and the switch terminal 112a; the switch 112; the lead 154; and that portion of lead 152 between terminal 154a and coil 117a; the coil 117a; and lead 153.

It is desirable to have a suitable pilot light as at 155 which will flash on to indicate a full bag. That is, when the desired weight or a desired count of fruit has been filled into a bag, the light will go on. This can be accomplished, for example, by connecting the pilot 155 in a circuit having therein the above-mentioned normally open switch 136 which becomes closed when the desired weight or count of fruit is reached. Suitable leads 156 and 157 are employed for connecting the pilot light into said circuit including the switch 136. Lead 156, for example, is connected to the power terminal 126a and thence to the switch 122 at terminal 122a. The lead 157 is connected between the pilot light and the electrical lead 143 at a point 158. Switch 136 is intermediate the point 158 and the lead 129, the latter being connected directly to the switch 122 at terminal 122b.

In operation, the main electrical disconnect switches 104, 105, 119 and 122 are initially open. These are preferably closed in the following order: (1) The main disconnect switch 105, which thereby provides power for the other disconnect switches 104, 119 and 122. (2) 119 thereby providing power for the deflector solenoid 56 and the cut-off gate solenoid 82. The latter will be immediately energized because the control switch 136 for the solenoid relay 118 is normally closed and thus the relay 118 will be actuated to provide power for the solenoid 82. (3) Switch 122, whereby power is provided for the various relay coils. (4) The motor disconnect switch 104, which directs energy to the starter switches 103 and 106 for the elevator-lower belt motor 69, and the surplus removal motor 52a, respectively.

Switches 103 and 106 now can be closed whereby their respective conveyors are actuated.

Thereafter the start button 107 is momentarily closed, thereby energizing the clutch coil 130 which has the following effects: (a) the normally closed switch 136 is opened, thereby deenergizing coil 118a and the cut-off gate solenoid 82, thus the deflector 80, under the influence of spring 84, moves to its normal position as indicated in Fig. 17; (b) the normally open switch 127 is closed, thereby completing the electric circuit for the motor 68 starter control coil 109a, thereby closing the sub-switches 109b, 109c and 109d for the upper belt motor 68. The latter motor consequently is started.

After the start button 107 has been released, after a momentary closing thereof, the so-called locking circuit in which the locking switch 135 is connected, becomes effective to maintain the energization of the clutch coil 130. This energization of the clutch coil 130 is maintained until a desired weight or a desired amount of objects has been filled into a bag placed upon the filling tube 72 of the bag packer.

Connected in the above-described locking circuit or interlock circuit is the scale beam micro-switch 85. When a desired weight of objects has been filled into a bag, the weighing movement of the scale beam 70 will open the micro-switch 85, thereby breaking the locking circuit for the clutch coil 130. The latter consequently will become deenergized and will close the switch 136 and open the switch 127. The respective effects of the closing and opening of said switches is: (a) to energize the cut-off gate solenoid 82; and (b) to stop the motor 68. Thus there is simultaneously a stoppage of motor 68 and belt 44 and a movement of the deflector 80 to shut off a flow of objects to the bag.

After the motor 68 for the main conveyor has been started, oranges or other objects are fed from the sorting device 32 onto the lower or subordinate conveyor 50 and thence to the elevator conveyor 51 which directs same onto the inclined chute 54 and thence to the main conveyor 44 driven by said motor 68. The latter conveyor 44 directs the fruit or other objects into the passage member 48 or filling tube and, of course, past the deflector 80. If for any reason a jam or an overload should occur upon the main conveyor, objects will accumulate thereon which will pile up on the inclined chute 54. When a preselected weight of objects has so piled up on chute 54, the micro-switch 56a will be closed and the solenoid 56 will be energized and the deflector unit 49 will be actuated whereby the deflector 53 will direct the oncoming fruit from elevator 51 onto the surplus removal conveyor 52. This condition will persist until the micro-switch 56a is opened, indicating that the overload condition has been relieved whereupon a normal flow will be resumed.

When it is desired to pack the objects by count instead of by weight the counting mechanism is adjusted for a preselected number and the scale beam is locked with the weighted extremity in a down position, that is, with the outer or bag extremity in an upper position. Under these conditions the critical clutch coil 130 is no longer under the influence of said scale beam micro-switch but under the counter micro-switch 91 and the counter device. The micro-switch 91 will be closed each time an object passes over the counter finger 90 and after a preselected number of impulses have been directed to the counter coil 92, the mechanism interconnecting same with the locking switch 135 becomes effective to open said locking switch 135 whereby the clutch coil 130 becomes deenergized and said switches 136 and 127, respectively, are closed and opened. Thereafter there occur the energization of the cut-off gate solenoid 82 and the arresting of the motor 68.

When a bag upon a filling tube becomes filled with a desired quantity of fruit, the corresponding belt 44 is arrested, as above explained, the filled bag is immediately removed and an empty bag applied. A normal bag changeover time is about five seconds. If the bag changeover time is in excess of five seconds, fruit might be rejected by means of the deflector 53 but normally the apparatus will absorb the fruit delivery to it during the bag changeover time. This is because the apparatus will pack fruit even when it is delivered to it by the sizer and the elevator and also because the fruit picks up speed as it goes down the chute 54a and a five or six foot space is created between the end of said chute and the last fruit on the top belt every time a bag is filled and said belt is stopped. This space on the top belt can absorb the fruit during the non-packing or bag changeover time.

When it is desired to stop the operation of the apparatus, for example, in an emergency, the stop button 110 is momentarily opened. This stop button is connected in the same circuit as the scale beam micro-switch 85 and has the same effect as the closing of the latter, namely, the breaking of the locking circuit for the clutch coil 130 and thus the deenergization of said clutch coil and an opening of the locking switch 135. The above-mentioned results follow, namely, the immediate stopping of the main conveyor belt motor 68 and a closing of the cut-off gate 80 by virtue of the energization of the solenoid 82.

The upper belt conveyor can be emptied or stripped by closing the switch 111 whereby the motor 68 is actuated for the period of the closing of said switch 111. This is accomplished by a short circuiting of the control switch 127 whereby the circuit of the starter relay control coil 109a is completed. At such time as the so-called main conveyor stripper switch 111 is closed, the deflector 80 will be in its closed position and the actuation of the main conveyor 44 will move all of the objects thereupon onto the return chute 87 and thence onto the lower conveyor 50 from which the fruit can be removed to the surplus removal conveyor 52 provided the solenoid 56 is actuated to move deflector plate 53 to the position shown in broken lines in Fig. 8.

When it is desired to empty or strip the lower conveyor 50 of the objects thereupon, it is, of course, necessary to actuate the deflector 53 whereby the oncoming objects which are lifted by the elevator conveyor 51 are directed onto the surplus removal conveyor 52. This can be accomplished by actuating the deflector unit without disturbing any of the other elements of the apparatus, namely, by manually closing the switch 112 whereby the deflector 53 is actuated in the same manner as if the inclined chute micro-switch 56a were closed. Thus the contents of the lower conveyor can be removed and the device made ready, for example, for a change of size of objects to be packed.

Another form of the invention is shown in Figs. 22 and 23 which in general employs only the sorting device 32 and the bag packer 30. The sorter 32 feeds directly into the bag packer, for example, by suitable chutes 34a, 35a, 36a and 37a.

Fruit issuing from the sorter 32 is forced by gravity, for example, down the chute 37a into the bag packer 30. When a desired weight or count of fruit has been reached, the deflector gate 80 is actuated in the manner above described and the flow of fruit is diverted onto the inclined chute 87 and thence to a manual packing bin as at 87a. The sorter deflector 38 can be employed which is similar to that above described and which is positioned to deflect fruit into the bin 87a.

The novel packing device has been described in connection with the packing of oranges. However, it may also be employed for the packing of other objects, for example, grapefruit, lemons, limes, onions, or objects of roughly similar conformation which can roll.

While the invention has been described with respect to certain preferred examples which have given satisfactory results, it will be understood by those skilled in the art after understanding the invention that various changes and modifications may be made without departing from the spirit and scope of the invention, and it is intended, therefore, in the appended claims to cover all such changes and modifications.

What is claimed as new and is desired to be secured by Letters Patent is:

1. In apparatus of the class described, a trough conveyor adapted for holding objects in column thereon and moving same to a discharge point; feeding means for directing objects seriatim to said conveyor; a deflector interposed between said feeding means and said conveyor for deflecting away from said conveyor the flow of objects; mechanism for actuating said deflector in response to an overload condition upon said conveyor; a packer unit adjacent the discharge point of said conveyor and having a passage member adapted for receiving objects from said conveyor and directing same to a container held in filling relation therewith; said packer unit having a filling tube; a cut-off gate associated with the filling tube; mechanism for closing the cut-off gate in response to a preselected quantity of objects filled into the container; and mechanism for arresting said conveyor in response to a preselected quantity of objects filled into the container.

2. In apparatus of the class described, the combination comprising, a secondary conveyor; a primary conveyor adapted for receiving objects discharged by the secondary conveyor; mechanism for diverting the flow of objects away from the primary conveyor in response to an overload condition upon said primary conveyor; a filling tube for directing objects into a bag held in filling relation with said tube; a cut-off gate adapted for arresting the flow of objects in said tube and diverting same onto said secondary conveyor; and mechanism for actuating said cut-off gate in response to a preselected quantity of objects filled into the bag and for simultaneously arresting said primary conveyor.

3. In apparatus for packing objects of substantially rounded configuration, the combination comprising, a filling tube through which the objects are directed to a container held in filling relation therewith; means for conveying the objects in a column from a source of supply of the objects to said filling tube; a deflector unit interposed between said last named means and the source of supply; mechanism operable in response to an overload of objects upon said conveying means for actuating said deflector unit to divert the flow of objects away from said conveying means; a cut-off gate associated with said filling tube; mechanism for closing said cut-off gate and stopping said conveying means in response to a preselected quantity of objects filled into the container.

4. In apparatus of the class described the combination comprising, a packer unit having a filler passage member for directing objects into a container; an endless belt conveyor for conveying objects to said packer unit; a side wall for said belt conveyor, the latter being tilted transversely toward said side wall; and mechanism for arresting the flow of objects through the filler passage member in response to a predetermined quantity of objects having passed therethrough.

5. In apparatus of the class described, a bin for holding a plurality of substantially spherical objects of a preselected size; mechanism for discharging said objects from said bin; a packer unit for packing said objects into containers; a conveyor unit for conveying said objects from said bin to said packer unit comprising, a movable conveyor member, side walls for the latter, said member being transversely tilted toward one of said side walls for causing said objects to move in a column, one of said side walls having an overflow passage therein, and a passage member in communication with said overflow passage for directing the overflow away from the conveyor member.

6. In apparatus of the class described, a bin for holding a plurality of rollable objects; mechanism for discharging objects from said bin; a packer unit for packing said objects into containers; a conveyor unit for conveying said objects from said bin to said packer unit comprising a movable conveyor member, side walls situated one on each side of said conveyor member, one of said side walls having an overflow passage therein, and a passage member in communication with said overflow passage for directing the overflow away from said conveyor member.

7. In a packing apparatus for packing citrus fruit and objects of like conformation, the combination comprising: a packer unit comprising a container filling channel for directing said objects into a container, mechanism for arresting the flow of objects through said channel in response to a predetermined quantity of such objects filled into the container; and a conveyor unit for conveying said objects from a source of supply to said packer unit comprising, a movable conveyor member, a side wall for said conveyor member, the latter being transversely tilted toward said side wall whereby a substantially V-shaped channel is formed therebetween for causing said objects to move thereon in column.

8. A packing apparatus, comprising in combination: a pair of conveyors one above the other; an elevator conveyor for moving objects discharged by the lower conveyor to a discharge station above the upper of said pair of conveyors; an inclined chute situated below said station and adapted for receiving oranges discharged by said lift conveyor and directing same onto said upper conveyor, the lower extremity of said chute being in close proximity to said upper conveyor whereby as a result of stoppage of the flow of objects on said upper conveyor the objects will accumulate upon said chute; a deflector unit operatively associated with said inclined chute and adapted for diverting a flow of objects away from said inclined chute in response to a preselected weight of objects upon said chute; a filling tube adapted for receiving a bag in filling relationship therewith and positioned for receiving objects discharged from said upper conveyor; and mechanism for governing the flow of objects through said filling tube in response to a preselected quantity thereof in the bag.

9. In apparatus of the class described, the combination comprising: a plurality of primary conveyors; a plurality of secondary conveyors; a like plurality of inclined chutes having respective of the lower extremities thereof adapted for discharging objects upon respective of said primary conveyors; a like plurality of lift conveyors adapted for receiving objects from respective of said secondary conveyors and for lifting and discharging same into respective of said inclined chutes; a discharge conveyor situated near said inclined chutes; a plurality of deflectors for governing the flow of objects discharged from respective of said lift conveyors onto either said discharge conveyor or respective of said inclined chutes; means for governing respective of said deflectors in accordance with the weight of objects upon respective of said inclined chutes; a like plurality of passage members adapted for receiving from respective of said primary conveyors objects discharged therefrom, said passage members being adapted for directing objects into containers held in filling relation therewith; a like plurality of cut-off gates associated with respective of said channel members; a like plurality of mechanisms for actuating respective of said gates to cut off the flow of objects in respective of said channel members in response to predetermined quantities of said objects passing through respective of said channel members; and a like plurality of mechanisms for directing respective of the flows of said objects which have been cut off by actuation of respective of said gates onto respective of said secondary conveyors.

10. In apparatus of the class described, the combination comprising: a first conveyor; a lift conveyor associated with said first conveyor and adapted for receiving objects therefrom to be conveyed upwardly; an inclined chute associated with said lift conveyor and adapted for receiving objects lifted thereby; a second conveyor located above said first conveyor and positioned for receiving objects from said lift conveyor by way of said inclined chute; an overflow conveyor positioned near said lift conveyor; a deflector associated with said lift conveyor and so constructed and arranged normally to permit objects discharged by said lift conveyor to move to said inclined chute, and also adapted for deflecting a flow of objects discharged by said lift conveyor onto said overflow conveyor; mechanism operatively associated with said deflector and said inclined chute whereby said deflector is actuated in response to a preselected weight of objects upon said chute to deflect objects being discharged by said lift conveyor onto said overflow conveyor; a filling tube for a bag positioned for receiving objects from said second conveyor; a return chute for directing objects from said second conveyor onto said first conveyor; a return chute deflector for governing the movement of objects either from the second conveyor to said filling tube or said return chute; mechanism for controlling said return chute deflector in response to the quantity of objects which have passed through said filling tube; power means for actuating said second conveyor; and means for arresting the motion of said second conveyor in response to the actuation of said return chute deflector.

WILLIAM R. PETERSON.

REFERENCES CITED

The following references are of record in the file of this patent:

UNITED STATES PATENTS

| Number | Name | Date |
| --- | --- | --- |
| 1,806,879 | Lindgren | May 26, 1931 |
| 2,204,126 | Domke | June 11, 1940 |
| 2,467,995 | Schlechter | Apr. 19, 1949 |